United States Patent

[11] 3,589,456

[72] Inventor Walter P. McKain
  Parkersburg, W. Va.
[21] Appl. No. 852,564
[22] Filed Aug. 25, 1969
[45] Patented June 29, 1971
[73] Assignee Acme Fishing Tool Company
  Parkersburg, W. Va.

[54] DRILL BIT
  3 Claims, 6 Drawing Figs.
[52] U.S. Cl. ................................................ 175/414
[51] Int. Cl. .......................................... E21b 13/08
[50] Field of Search .................................. 175/420, 414

[56] References Cited
UNITED STATES PATENTS
2,863,639 12/1958 Bredesen ..................... 175/114
2,865,607 12/1958 Tilden ......................... 175/420
3,283,837 11/1966 McKain ....................... 175/414

Primary Examiner—James A. Leppink
Attorney—Edward Hoopes, III

ABSTRACT: A drill bit having a body and cutting teeth projecting endwise from the body, each of the cutting teeth having a cutting face at its extremity remote from the body, at least certain of the cutting teeth extending laterally to the periphery of the body, the lateral ends of such cutting teeth at the periphery of the body being inclined from the periphery of the body inwardly, normally at an angle between about 120° and about 150°, preferably at an angle of about 135°, to the cutting faces of the teeth. The body of the drill bit may be cut away at each side of each lateral end at the periphery of the body of each cutting tooth which extends laterally to the periphery of the body to cause the cutting tooth to in effect extend into the body at such lateral end thereof with channels in the body on opposite sides thereof.

PATENTED JUN29 1971 3,589,456

WALTER P. McKAIN
INVENTOR
BY
Edward Hoopes III
HIS ATTORNEY

ORIGINALLY AS DRESSED

AFTER BEING USED

WALTER P. McKAIN
INVENTOR
BY

Edward Hoopes III

HIS ATTORNEY

DRILL BIT

This invention relates to a drill bit and is in the nature of an improvement over the drill bit of my U.S. Pat. No. 3,283,837. While the drill bit of my said patent has proved quite successful in use I have found that I can increase the life of the drill bit and also its drilling efficiency by certain modifications of the cutting teeth and of the body or head of the drill bit adjacent the cutting teeth. By such modified structure I eliminate breaking of the cutting teeth when starting a freshly dressed bit in a hole which has been allowed to wear undersize, maintain the width of the cutting teeth throughout the life of the bit point (i.e., between dressings) and bring the reaming edges of the bit into more effective contact with the bottom of the hole.

I provide a drill bit having a body and cutting teeth projecting endwise from the body, each of the cutting teeth having a cutting face at its extremity remote from the body, at least certain of the cutting teeth extending laterally to the periphery of the body, the lateral ends of such cutting teeth at the periphery of the body being inclined from the periphery of the body inwardly, normally at an angle between about 120° and about 150° preferably at an angle of about 135° to the cutting faces of the teeth. The body of the drill bit may be cut away at each side of each lateral end at the periphery of the body of each cutting tooth which extends laterally to the periphery of the body to cause the cutting tooth to in effect extend into the body at such lateral end thereof with channels in the body on opposite sides thereof.

Other details, objects and advantages of the invention will become apparent as the following description of a present preferred embodiment thereof proceeds.

In the accompanying drawings I have shown a present preferred embodiment of the invention in which FIG. 1 is a side view of a drill bit embodying my invention viewed in a direction parallel to the cutting teeth;

Referring now more particularly to the drawings, I have chosen to illustrate my invention as embodied in a drill bit primarily adapted for use by the cable tool method of percussion drilling although it is to be understood that my invention is equally applicable to drill bits designed for other types of percussion drilling, such, for example, as drilling with the use of a down-the-hole air hammer.

Figure 1:
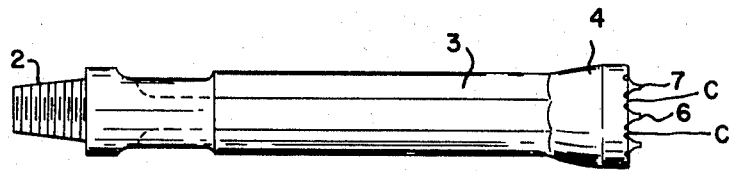
Figure 2:
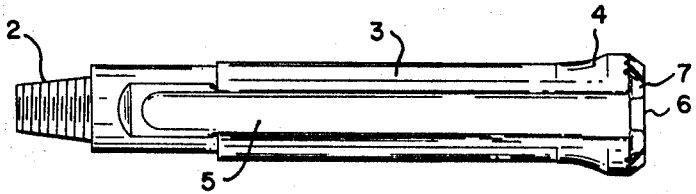
FIG. 2 is a side view of the drill bit shown in FIG. 1 viewed in a direction normal to the cutting teeth.

As shown in FIGS. 1 and 2, my drill bit has a conventional tapered threaded end 2 for connection with a cable or other operating means. The drill bit comprises a body having a shank 3 with a head 4 at the operative end of the shank. The drill bit is shown as having the conventional opposed longitudinal channels 5 for the passage of drilling fluid. The drill bit may have internal passage means (not shown) for conveying drilling fluid downwardly to the working area, the drilling fluid with entrained broken up rock and dirt passing upwardly through the channels 5. The drill bit as thus far described may be conventional.

In the form of drill bit shown in the drawings the body of the bit comprises, as above stated, the shank 3 and the head 4. On the head 4 and facing endwise of the drill bit are a tooth 6 which is preferably substantially straight and which extends continuously completely across the head 4 to the periphery thereof at both sides at a portion of the head remote from the channels 5 and shorter teeth 7 at each side of the head and extending to the periphery thereof, the teeth 7 at each side being in alignment with each other at opposite sides of the channel 5 at that side. All of the teeth 6 and 7 are preferably elongated and straight and parallel to one another. Each of the teeth has a base 8 on the head 4 and terminates in a cutting face 9 consisting of a flat surface disposed substantially in a plane normal to the length of the drill bit. For optimum efficiency the cutting faces of all of the teeth should be disposed substantially in a common plane normal to the length of the drill bit as shown in FIGS. 1, 2, 5 and 6.

The bit has transverse channels 10 between the cutting teeth extending to the reaming edges of the bit, which reaming edges are designated by C. Free flow is provided for between the transverse channels 10 and the longitudinal channels 5 as each of the longitudinal channels 5 intersects the adjacent transverse channel 10 substantially at the bottom thereof.

The bit wears undersize on the diameter and has to be resharpened from time to time. The bit should not be allowed to wear excessively before resharpening; however, usually the driller does not inspect his bit until he has drilled for a certain time or depth which varies with conditions, wherefore he may encounter a situation in which his fresh or resharpened bit is larger than the diameter of the hole at the bottom. The hole of course is always slightly tapered between the points of bit changes. Under these conditions the driller must be careful not to wedge the fresh bit in the tapered hole as this could lose him much time jarring it loose and reaming. In addition, wedging of the bit in a tapered hole places high stresses on the cutting teeth, especially at the ends thereof. Such stresses frequently cause the cutting teeth to break off, rendering them ineffective or at least reducing their efficiency. Even if the bit is not tight off bottom a problem exists of starting a bit with cutting teeth having their lateral ends at the periphery of the body at right angles to their cutting faces 9 (see FIG. 5) in a hole whose periphery at the bottom has a radius R caused by the worn bit previously removed. This could be seriously damaging and adds to the rapidity with which the corner of the cutting tooth deteriorates.

Figure 5:
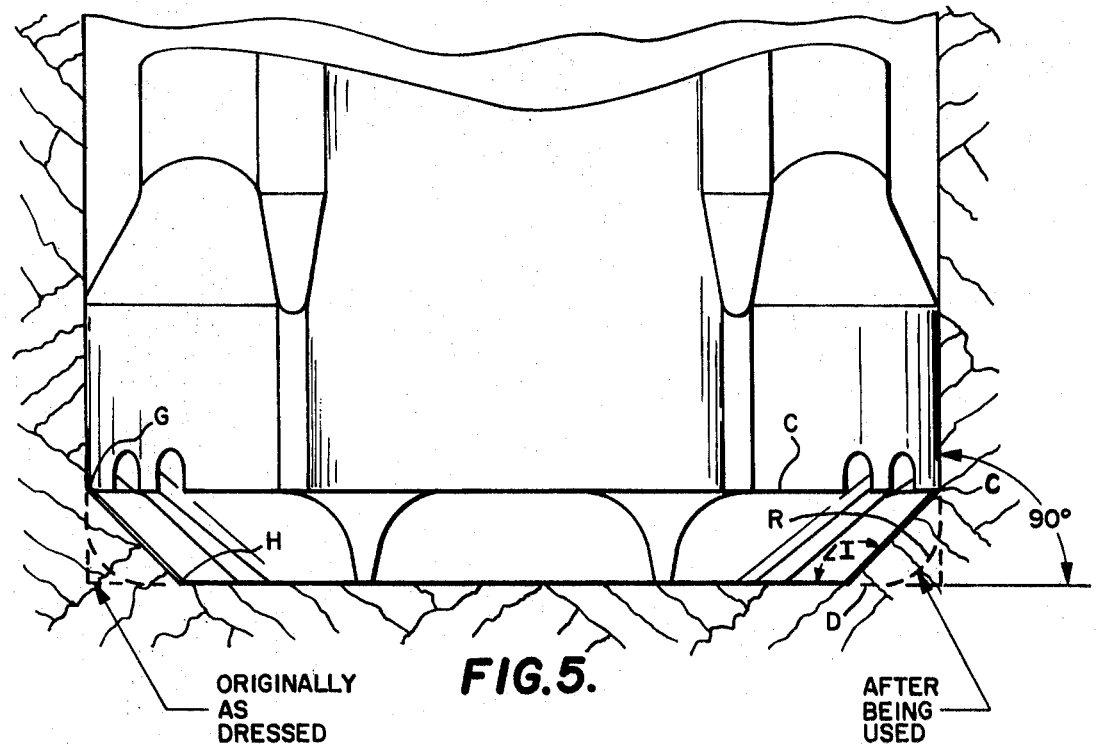
FIG. 5 is a fragmentary detail view to enlarged scale of the drill bit operating in a hole being drilled, the drill bit being viewed in a direction normal to the cutting teeth.
Figure 6:
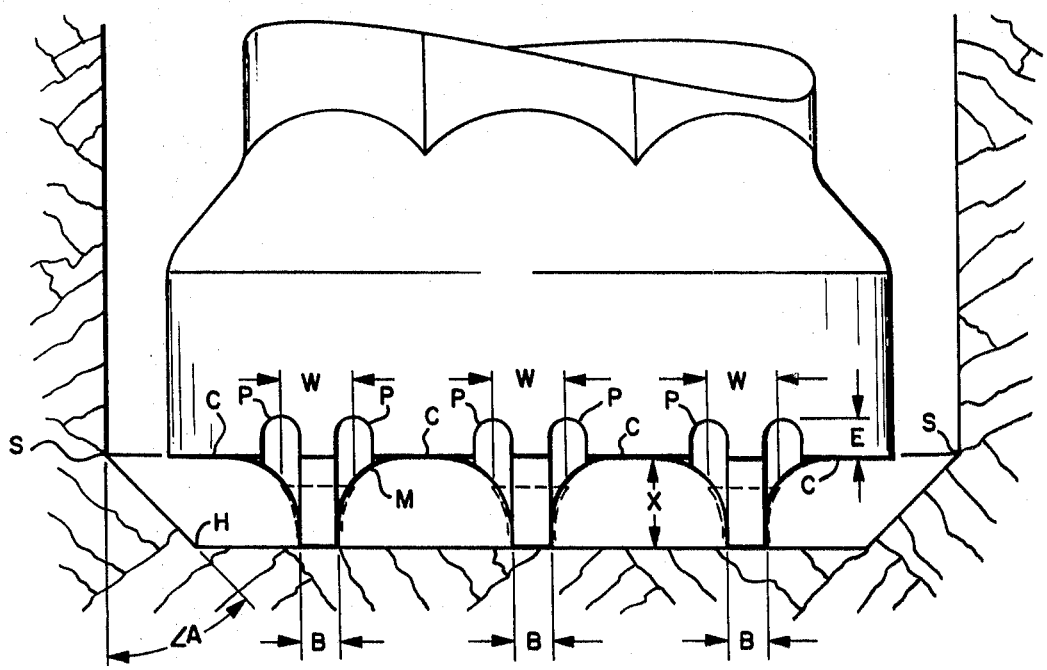
FIG. 6 is a view similar to FIG. 5 but taken at right angles thereto, i.e., viewing the drill bit in a direction parallel to the cutting teeth.

Field experience has shown that 90° edges at the extremities of as-dressed cutting teeth tend to wear away to form a radius R (FIG. 5). In hard rock such as granite this occurs rather rapidly so within one-half hour the radius R could be as much as three-eighths inch. After several hours R reaches a maximum of about one-half inch. This altered shape of the cutting teeth due to wear also generates a radius at the periphery of the bottom of the hole. This curved area is engaged by wider parts of the cutting teeth at W (FIG. 6), increasing the total area of the cutting teeth in vertical contact with the bottom, which of course reduces the unit stress for a given amount of applied load. Breaking off of cutting teeth due to wedging as above described is completely eliminated by my improved drill bit. In the form shown in the drawings the lateral ends of the cutting teeth at the periphery of the body of the drill bit are inclined from the periphery of the body inwardly. The inclination is at an angle I to the cutting face of the tooth (see FIG. 5). That angle should be between about 120° and about 150° an angle of about 135° being found satisfactory under most conditions. The angle between the ends of the cutting teeth and the wall of the hole is designated A in FIG. 6, which angle is the supplement of the angle I shown in FIG. 5. The angle A does not have to be very large to eliminate the wedging effect on the cutters in a tight hole. If the angle A (FIG. 6) is made less than 45° there is an increased tendency to form a radius at the corner H and reduce the force applied to the cutter face G-H (FIG. 5). The angle A should be great enough to eliminate a substantial radius as indicated at R in FIG. 5. In order to maintain the same unit stress for a given load the sides of the cutting teeth where radiused at R (FIG. 5) are ground so that the thickness B (FIG. 6) is maintained from C to D (FIG. 5). This wearing to a radius R has not had a substantial effect toward reducing the rate of penetration but the grinding has made noticeable improvement in the penetration rate—as much as 10 percent. By milling a groove P in the body or head of the bit at each side of each lateral end of each cutting tooth (FIG. 6) the uniform thickness B of the cutting teeth is maintained throughout the length of the cutting teeth. This thickness remains constant during the life of the bit subject of course to nominal wear between dressings. The milling of the grooves P effectively eliminates the need for grinding above referred to.

Figure 3:
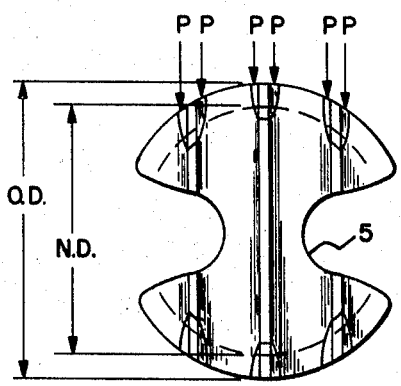
FIG. 3 is an end view to enlarged scale of the drill bit shown in FIGS. 1 and 2 as viewed from the right-hand end of those figures.
Figure 4:
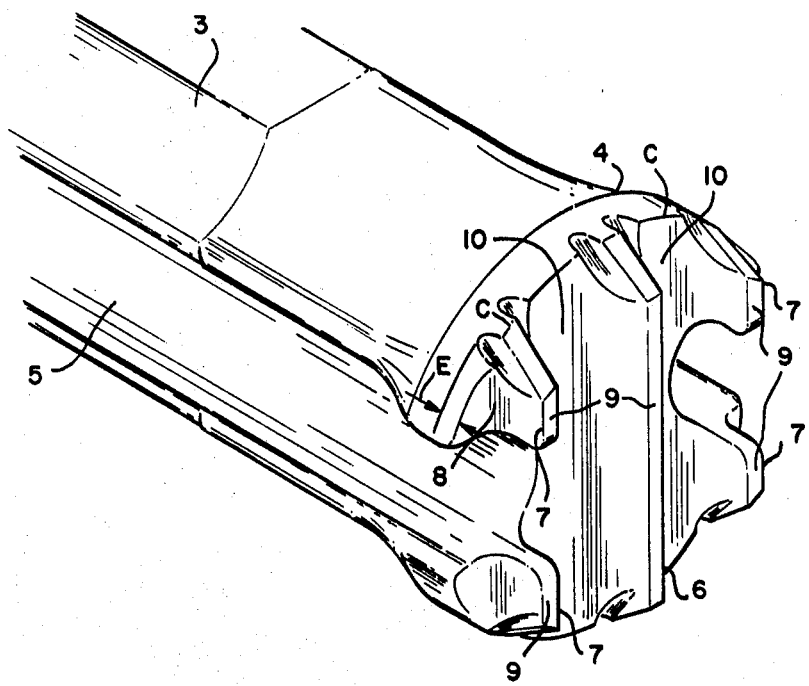
FIG. 4 is a fragmentary isometric view to further enlarged scale of the end portion of the drill bit.

My improved drill bit has improved reaming capabilities. A shoulder is created at S (FIG. 6) in the wall of the hole which responds more favorably to the shearing action of the improved reaming edges C. Extending the grooves P along the surface of the bit vertically for a distance E (FIG. 6) eliminates the large radius M giving a toothlike shape to the reaming edges and improving their shearing capability when engaging the shoulder S. In addition the depth of the grooves P is so designed as to insure the maintenance of the width of the cutting teeth B at the point where the cutting teeth join the reaming edge C throughout the effective life of the bit. This is the wear required to reduce the diameter of the bit below its usefulness as from O.D. to N.D. in FIG. 3.

While I have shown and described a present preferred embodiment of the invention it is to be distinctly understood that the invention is not limited thereto but may be otherwise variously embodied within the scope of the following claims.

I claim:
1. A drill bit having a body and cutting teeth projecting endwise from the body, each of the cutting teeth having a cutting face at its extremity remote from the body, at least certain of the cutting teeth extending laterally to the periphery of the body, the lateral ends of such cutting teeth at the periphery of the body being inclined from the periphery of the body inwardly, the body of the drill bit being cut away at each side of each lateral end at the periphery of the body of each cutting tooth which extends laterally to the periphery of the body to cause the cutting tooth to in effect extend into the body at such lateral end thereof with channels in the body on opposite sides thereof.

2. A drill bit as claimed in claim 1 in which the lateral ends at the periphery of the body of the cutting teeth which extend laterally to the periphery of the body are inclined from the periphery of the body inwardly at an angle between about 120° and about 150° to the cutting faces of the teeth.

3. A drill bit as claimed in claim 1 in which the lateral ends at the periphery of the body of the cutting teeth which extend laterally to the periphery of the body are inclined from the periphery of the body inwardly at an angle of about 135° to the cutting faces of the teeth.